US005159958A

United States Patent [19]

Sand

[11] Patent Number: 5,159,958

[45] Date of Patent: Nov. 3, 1992

[54] CHEMICAL EDUCTOR WITH INTEGRAL ELONGATED AIR GAP

[75] Inventor: William F. Sand, Cincinnati, Ohio

[73] Assignee: Hydro Systems Company, Cincinnati, Ohio

[21] Appl. No.: 732,469

[22] Filed: Jul. 18, 1991

[51] Int. Cl.[5] .......... F16K 1/00

[52] U.S. Cl. .......... 137/888; 137/896

[58] Field of Search .......... 137/888, 896

[56] References Cited

U.S. PATENT DOCUMENTS

| | | | |
|---|---|---|---|
| 1,102,505 | 7/1914 | Henderson | 137/888 |
| 1,195,915 | 8/1916 | Damrow | 137/888 |
| 2,250,291 | 7/1941 | Boosey | 137/111 |
| 2,288,247 | 6/1942 | Kunstorff | 137/111 |
| 3,072,137 | 1/1963 | McDougall | 137/216 |
| 3,166,086 | 1/1965 | Holmes | 137/217 |
| 3,273,866 | 9/1966 | Lancy | 261/19 |
| 4,697,610 | 10/1987 | Bricker et al. | 137/3 |
| 4,721,126 | 1/1988 | Horii | 137/888 |

FOREIGN PATENT DOCUMENTS

| | | | |
|---|---|---|---|
| 216557 | 5/1908 | Fed. Rep. of Germany | 137/888 |
| 1428452 | 1/1969 | Fed. Rep. of Germany | 137/888 |

*Primary Examiner*—A. Michael Chambers
*Attorney, Agent, or Firm*—Wood, Herron & Evans

[57] ABSTRACT

An improved venturi eductor for proportional dispensing of chemicals into flowing water includes a large antisyphoning air gap to satisfy water system regulations. Specialized baffles are provided to prevent discharge of spray and mist from the air gap. Further, the shape and location of various nozzles within the device creates a slight suction at the air gap to further limit overspray.

7 Claims, 2 Drawing Sheets

CHEMICAL EDUCTOR WITH INTEGRAL ELONGATED AIR GAP

BACKGROUND OF THE INVENTION

It is a common practice for chemicals such as those used for cleaning and sanitizing to be purchased as concentrated liquids. The chemicals are mixed with water to achieve the desired usage concentration. A variety of proportioning dispensers have been developed to achieve this. These dispense mixtures at use concentration. The dispensers often employ venturi devices sometimes called eductors to proportion the chemical and deliver this for use. Water traveling through the central portion of the venturi creates suction which draws the chemical into the water stream. The amount of chemical educted is controlled by a metering orifice in the chemical feed line.

The concentrations desired in this type of chemical dispensing varies greatly ranging from 1:1 to over 1:1000. The devices also must function with a wide range of water pressures, temperatures and dissolved minerals and gases. In some of these conditions, the eductors function much like classical flow venturies, while in other they are more like jet pumps. The devices are mechanically simple, generally without moving parts, but small details of the construction have important influence on their performance.

It is usually desirable to operate these dispensers with water provided directly from the public water supply. In this situation, the dispensers are subject to the regulations of the public water departments who are concerned about preventing any possibility of the chemical concentrates entering the water system. Such an event is known as back flow when caused by positive pressure such as from a boiler. It is referred to as back syphoning when the flow is caused by suction in the water system.

A variety of devices and techniques exist to prevent backflow and back syphoning. The most effective mechanical backflow devices and the ones most accepted by the public water departments are relatively large, expensive devices which require regular testing and certification. The installation and inspection of these devices is often more expensive than the acquisition and installation of the dispensers themselves.

The regulations regarding backflow and back syphoning and the research supporting them generally recognize the simple air gap is the most effective protection of all. The simplest illustration of an air gap is a faucet whose end is above the top of the sink. If there is any suction from the water system, it cannot pull in anything from the sink, only air.

It is known to combine a venturi eductor with an air gap for back syphoning protection for dispensing applications. Such devices are described in U.S. Pat. Nos. 4,697,610 and 3,166,086 as well as U.S. Pat. Nos. 3,072,137 and 3,273,866. These function in specific applications. However, their air gaps are generally less than half an inch, and many standards require that the air gap be at least one inch.

In such applications where such a large air gap is employed, it is difficult to control the proportioning of the venturi and also difficult to prevent collateral spray from being emitted from the air gap.

Devices that include baffling to prevent collateral spray are disclosed in Kunstorff U.S. Pat. No. 2,288,247 and Boosey U.S. Pat. No. 2,250,291. Neither of these devices are directed at chemical eductors and therefore they have no concern with effectively proportioning the educted chemical. Further, the structures disclosed in these devices would be unsuitable for chemical eductors. The geometry for a chemical eductor is very precise.

The essential geometry of a venturi is that of an enlargement in a contained stream of fluid. According to Bernoulli's theory, suction is created at the point where the flow channel widens. The operation of the venturi requires that the entering fluid stream have a certain amount of flow energy. For an air gap eductor, this means that the stream must cross the air gap and enter the venturi developing appreciable pressure within the entrance of the venturi.

The geometry which will create this includes a nozzle diameter somewhat larger than the smallest diameter of the front part of the venturi along with a funnel structure leading to this venturi orifice. Not all the water volume from a water jet can enter the venturi and some degree of overflow is created.

The performance of the nozzle is critical for the correct operation of the unit. It must discharge a well defined stream across the air gap and into the inductor.

Such concerns are not present in siphon breakers and back flow preventors for water systems which are merely concerned with backflow. Such critical dimensions are certainly not a problem for chemical eductors that have relatively small air gaps or where those where overspray is not a critical concern.

SUMMARY OF THE INVENTION

Accordingly, it is an object of the present invention to provide a chemical eductor which incorporates a long air gap generally at least one inch.

Further, it is an object of the present invention to provide such a chemical eductor which effectively proportions chemicals over a wide range of concentrations.

Further, it is an object of the present invention to provide such an eductor which does not emit overspray from the eductor.

The objects and advantages of the present invention are obtained by a chemical eductor which includes an entrance nozzle followed by an elongated air gap followed by a second nozzle leading into a chemical eductor venturi. Between the two nozzles is a baffle plate which effectively prevents any overspray from being emitted through the air gap. Overspray is turned back into an overspray cavity which directs the overspray within the eductor to the discharge orifice. By effectively controlling the size of the first nozzle relative to the second nozzle as well as controlling the shape and size of the opening in the spray baffle, overspray is minimized. The control and location of the nozzle permits creation of a strong reliable suction which effectively proportions chemical introduced through the eductor.

The operating water jet can be protected from disturbance by providing shielding in the air gap openings, and this shielding can also prevent overspray mist from leaving the air gap openings.

The objects and advantages of the present invention will be further appreciated in light of the following detailed description and drawings in which:

DETAILED DESCRIPTION

Figure 1:
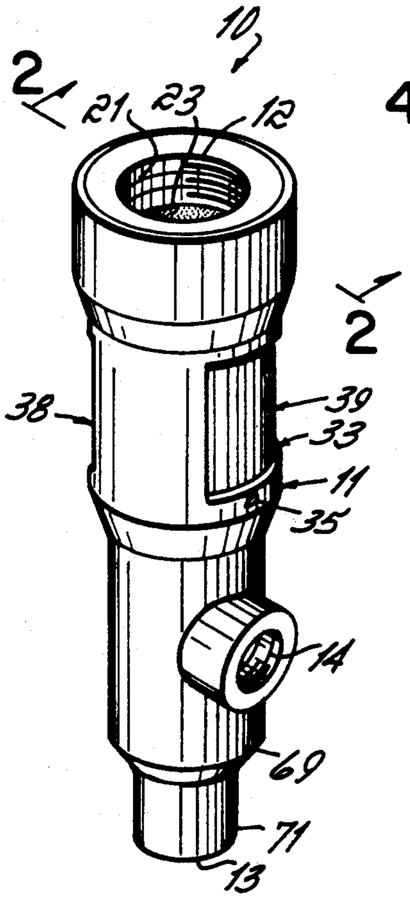
FIG. 1 is a perspective view of the present invention.
Figure 2:
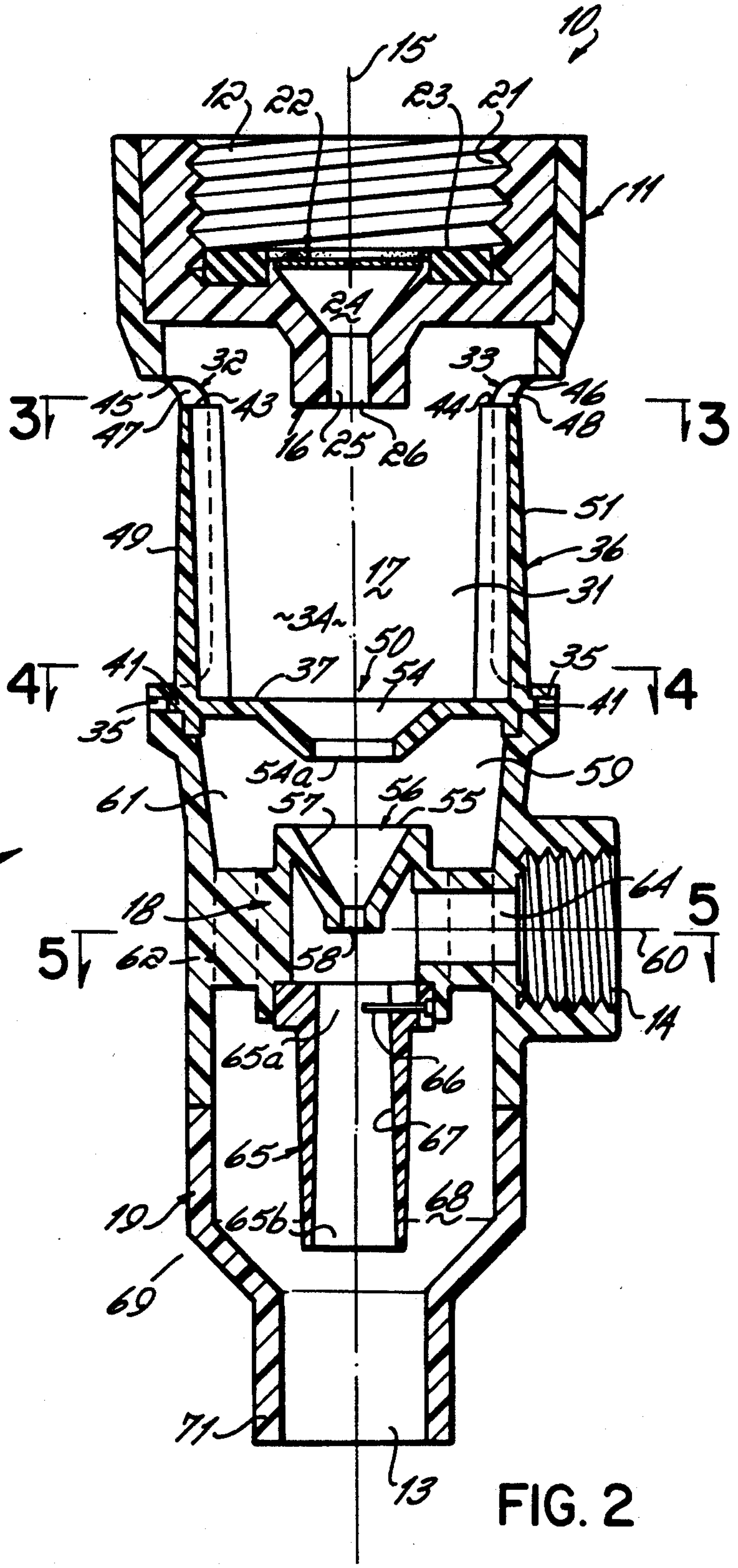
FIG. 2 is an axial cross-sectional view taken at lines 2—2 of FIG. 1.

The present invention is a chemical eductor 10 which includes an outer body 11 having an upstream water inlet 12, a downstream water outlet 13 and a chemical inlet 14 as shown in FIGS. 1 and 2. The water flows along the central axis 15 of the eductor 10 through an inlet nozzle 16, across an air gap section 17 through the eductor section 18 into the collection section 19.

Upstream of the inlet nozzle 16 is a threaded inlet 21 adapted to screw onto a water source (not shown). At the downstream side of the threaded inlet 21 is a strainer 22 which is held in place by washer 23. The strainer also serves as a flow stabilizer to help the nozzle deliver a dense, columnar stream. This in turn leads to a truncated, conical inlet 24 leading to the tubular nozzle 16 and through a tubular section 25 which terminates in a orifice 26.

Orifice 25 is directly centered along the central axis or axial flow path 15 of the eductor 10. Downstream of the nozzle 16 is the air gap chamber 17. Air gap chamber 17 includes an exterior tubular body 31 with a plurality of slots (two shown) 32 and 33. The length of slots 32 and 33 should be at least about one inch, as should the distance from the slot bottoms to the end of orifice 26. The interior wall 34 of the air gap chamber 17 is a tubular wall. The wall 34 should be spaced at least 3 times the size of passage 25 from the edge of orifice 26. At the bottom of the air gap chamber 17 are two holes 35 which extend through the side wall.

Figure 4:
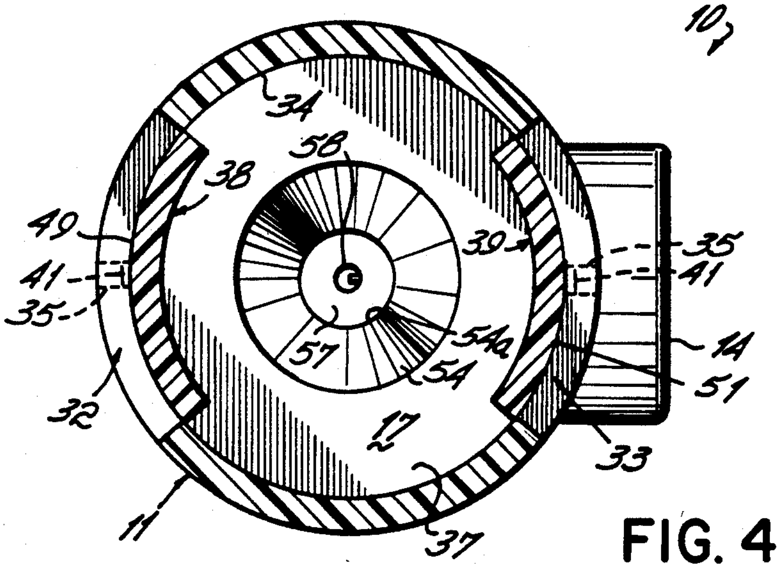
FIG. 4 is an overhead cross-sectional view taken at lines 4—4 of FIG. 2.

Located within the air gap section is an insert 36 which acts as a second nozzle, which includes an annular disc base 37 with two upwardly extending tabs 38 and 39. Lugs 41 of the insert 36 are snap fitted within the holes 35 maintaining the insert 36 in position (FIGS. 2 and 4).

Figure 3:
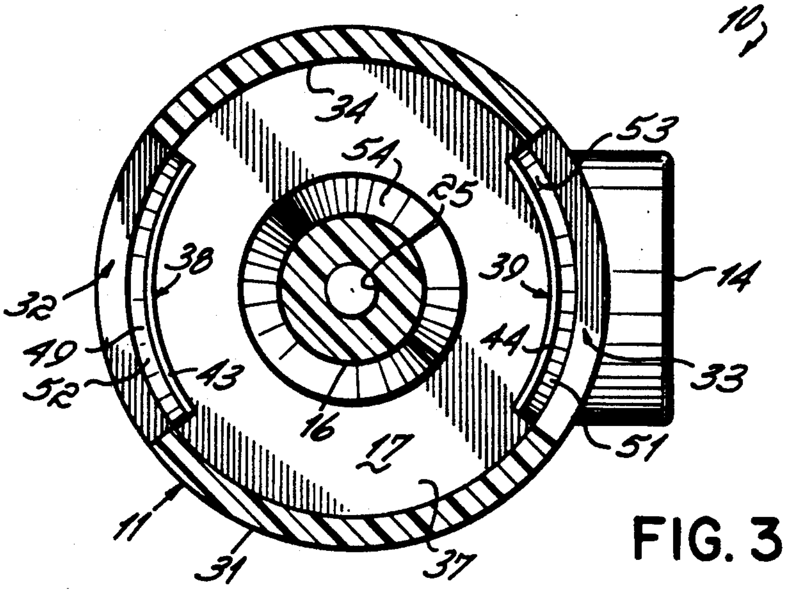
FIG. 3 is an overhead cross-sectional view taken at lines 3—3 of FIG. 2

As shown in FIGS. 2 and 3, the tabs 38 and 39 both have upper edges 43 and 44 which extend almost to the upper (upstream) edges 45 and 46 of slots 32 and 33, respectively. This provides a small gap area 47, 48 between the upper edges 43 and 44 of tabs 38 and 39 and slots 32 and 33. The exterior walls 49 and 51 of tabs 38 and 39 are tapered inwardly from their downstream side at base 37 to their upper edges 45 and 46. This provides tapered gaps 52 and 53 (FIG. 3) between the tabs 38 and 39 and the slotted portion 32 and 33 of the air gap chamber 17.

The disc base 37 includes a central opening 50 which includes a conical sloped portion 54 leading to an orifice **54*a*. The orifice 54*a* is aligned again with the central axis 15 of the eductor. This orifice opens to the eductor section 18**.

Eductor section 18 includes an eductor nozzle 55 which is spaced about half an inch from the orifice 46 of disc portion 37. The eductor nozzle 55 includes an entrance or upstream opening 56 which leads through a sloped conical portion 57 to an orifice 58. Between the eductor nozzle 55 and the disc portion 56 is an overflow chamber 61.

Figure 5:
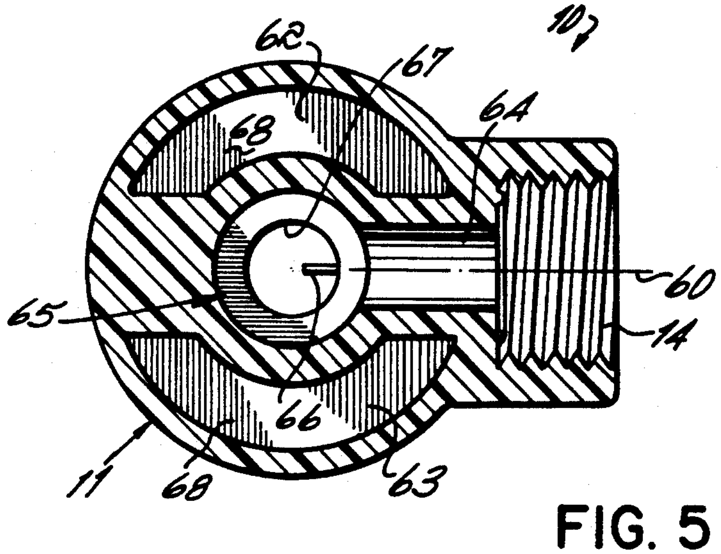
FIG. 5 is an overhead cross-sectional view taken at lines 5—5 of FIG. 2.

As shown more particularly in FIG. 5, the overflow chamber is an annular chamber which includes two openings 62 and 63 which bypass the eductor section 18 and lead to a collection chamber 68 beneath the eductor section 18.

The eductor section 18 downstream of the eductor nozzle includes a chemical feed passage 64 which passes from the chemical inlet 14 to the downstream side of orifice 58. The central axis 60 of the chemical feed passage 64 is shown aligned with the orifice 58 of the eductor nozzle 55.

Downstream of orifice 58 is the venturi diffuser tube 65 which includes an inlet **65*a* and an outlet 65*b*. The interior wall of 67 of venturi 65 as shown is slightly tapered at about 2°. The inlet of the venturi tube is approximately 3/32 of an inch from the orifice 58. Slightly downstream of the opening within the venturi tube is a flooder pin 66 which acts to disrupt the water stream causing it to contact the interior wall 67 of the venturi tube 65. The pin is used to cause a small turbulence in the diffuser to assure that the flowing water completely fills the diffuser, even at low water flows. Other means can be used to flood the diffuser, including a flow obstruction at the end of the diffuser. The venturi tube resides within collection chamber 68 which leads to an outlet tube 71. Outlet tube 71** can be connected to the tubular inlet of a washing apparatus or the like or can lead directly to a basin.

In operation, the threaded inlet 21 is connected to a source of water such as a hose or faucet. The threaded chemical inlet 14 is attached to a source of chemical such as a jug of liquid washing solution. Turning the water supply on forces water through the stabilizing strainer 22 into the conical opening 24 of nozzle 16 and through the tubular section 25 and out the orifice 26. This will create a narrow stream of water which will pass directly through the center of the air gap chamber 17 through the opening 50 in the disc base 37 striking the conical section 57 of eductor nozzle 55.

The water will then force its way through the orifice 58 and continue to the venturi diffuser 65. There it will expand and create a suction within the chamber 59 connected to 64. This will in turn draw the chemical from the supply through the chemical inlet 14 and passage 64 where it will mix in chamber 59 with the water passing through orifice of the venturi tube 65.

Some water which strikes the sloped portion 57 of the eductor nozzle 55 will spray in an upstream direction. This will strike the disc plate 37 which acts as a spray shield and will flow through openings 62 and 63 into the collection chamber 68. It will then mix with the water emitted from the venturi tube in the outlet tube 71.

Due to the shape and size of the disc opening, a slight vacuum is pulled at this area in a downstream direction which will pull air from the air gap as well as overspray that might be present in the air gap back to the eductor nozzle.

If there should be either suction from the water supply or back pressure, the one inch air gap provided in the air gap chamber will prevent any of the chemical entering through entrance 14 from being drawn into the water supply. Instead, back pressure would simply force the material through slots 32 and 33 in the air gap section. If there is suction, air would be pulled in through the slots 32 and 33 preventing any chemical from being pulled up through the eductor.

Preferably, the eductor of the present invention would be molded from glass filled polypropylene or the like in multiple sections. The inlet nozzle would be produced in one section and simply snap-fitted into the body 11 of the eductor. Likewise, the insert can be molded as a separate section and simply snap-fitted into the air gap section. The venturi nozzle is preferably of the same plastic as the body or can be of metal, ceramic, or other material as required. The flooder pin or other flooding between is simply welded or glued into position. As shown, the collection section includes an outer body portion 69 which can be molded in a separate section and simply snap-fitted or glued into position or can be integrally molded in the diffuser, depending on the specific design.

The relationship between the sizes of orifices 25 and 58 greatly influence performance. Best results are obtained when at least 15% of the flow through 25 overflows the entrance of 58. The included angle of the lead-in to 58 should be at least 30 degrees since a sharper angle does not allow a smooth overflowing. When the overflowing is relatively smooth, the distance between 37 and 55 can be minimized to keep required eductor length to a minimum.

The diameter of 65*a* should be at least about 0.030" greater than that of 58 and may be much greater to allow rich mixtures. Exact eductor performance is optimized for specific tasks by modifying key features including nozzles 25 and 58, lead-in 57, and the diameter, length, and flare of the bore of the diffuser 65.

It should be noted that tabs 38 and 39 supplement disc base 37. Should any overspray come within the air gap section, these tabs direct it back to the eductor section 18. But these are optional and can be eliminated.

There are obviously many different ways that the eductor of the present invention can be manufactured and modified and designed, yet still incorporate the features of the present invention.

Accordingly, the invention should only be defined by the appended claims wherein I claim:

1. A chemical eductor with integral air gap comprising a water inlet and a first nozzle;

an elongated air gap chamber between said first nozzle and a second nozzle having a spray shield disc said disc having an axially aligned opening and at least one slot;

a venturi nozzle downstream of said disc and a venturi diffuser tube downstream of said venturi nozzle;

a chemical inlet into an area between said venturi nozzle and said venturi diffuser;

an overspray chamber between said venturi nozzle and said spray shield disc communicating with a collection chamber downstream of said venturi nozzle.

2. The apparatus claimed in claim 1 wherein said venturi nozzle includes a truncated conical inlet larger than the opening of said spray shield disc.

3. The apparatus claimed in claim 1 wherein said air gap chamber includes a plurality of slots which are at least about one inch long.

4. The device claimed in claim 3 further comprising a plurality of tabs corresponding in size to the slots in said air gap chamber said tabs spaced from said slots to provide an air path through said slots into said air gap chamber.

5. The apparatus claimed in claim 2 wherein said spray shield disc is sloped downward to the opening in the disc.

6. The apparatus claimed in claim 4 wherein said tabs are tapered.

7. A chemical eductor with an integral air gap comprising:

a water inlet leading to a first nozzle;

an air gap section between said first nozzle and second nozzle having a spray shield disc said air gap section including a plurality of slots which are at least about one inch long and wherein said spray shield disc includes a central sloped opening;

a plurality of tabs extending up from said spray shield disc along and spaced from said slots;

a venturi nozzle downstream of said spray shield and an overspray collection chamber between said venturi nozzle and said spray shield;

said venturi nozzle aligned with a venturi diffuser tube;

a chemical inlet to an area between said venturi nozzle and said diffuser tube;

wherein said overspray chamber leads to a passage to an area downstream of said venturi nozzle to permit overspray to flow around said venturi nozzle and mix with water passing from said venturi tube.

* * * * *